United States Patent
Ho et al.

(10) Patent No.: US 7,840,769 B1
(45) Date of Patent: Nov. 23, 2010

(54) METHOD AND SYSTEM FOR PLAY-ONLY MEDIA PLAYER

(76) Inventors: Chi Fai Ho, 1021 University Ave., Palo Alto, CA (US) 94301; Shin Cheung Simon Chiu, 775 Talisman Ct., Palo Alto, CA (US) 94303

( * ) Notice: Subject to any disclaimer, the term of this patent is extended or adjusted under 35 U.S.C. 154(b) by 1049 days.

(21) Appl. No.: 11/595,362

(22) Filed: Nov. 9, 2006

(51) Int. Cl.
*G06F 12/14* (2006.01)
(52) U.S. Cl. .................................. 711/163; 726/26
(58) Field of Classification Search ................ 711/163; 726/26
See application file for complete search history.

(56) References Cited

U.S. PATENT DOCUMENTS

| | | | | |
|---|---|---|---|---|
| 5,045,327 A * | 9/1991 | Tarlow et al. | ............... | 704/270 |
| 5,504,836 A * | 4/1996 | Loudermilk | ............... | 704/272 |
| 5,826,235 A * | 10/1998 | Harman | ............... | 704/500 |
| 6,584,541 B2 * | 6/2003 | Friedman et al. | ............ | 711/103 |
| 2001/0052073 A1 * | 12/2001 | Kern et al. | ............... | 713/161 |
| 2002/0194492 A1 * | 12/2002 | Choi et al. | ............... | 713/200 |
| 2003/0158737 A1 * | 8/2003 | Csicsatka | ............... | 704/273 |
| 2003/0223730 A1 * | 12/2003 | Cornwell | ............... | 386/46 |
| 2003/0226030 A1 * | 12/2003 | Hurst et al. | ............... | 713/200 |
| 2006/0088292 A1 * | 4/2006 | Guillen et al. | ............... | 386/96 |
| 2006/0212541 A1 * | 9/2006 | Ueshima et al. | ............. | 709/219 |
| 2006/0282903 A1 * | 12/2006 | Jung et al. | ............... | 726/27 |
| 2007/0100757 A1 * | 5/2007 | Rhoads | ............... | 705/51 |
| 2007/0195987 A1 * | 8/2007 | Rhoads | ............... | 382/100 |

* cited by examiner

*Primary Examiner*—Jared I Rutz
(74) *Attorney, Agent, or Firm*—North Shore Patents, P.C.; Michele Liu Baillie

(57) ABSTRACT

A method and system for play-only media player is disclosed. The player includes a controller, a recording interface, and a non-removable storage. In recording content onto the media player, media signals are received through the recording interface. The media signals are stored in a media file on non-removable storage. When a controller receives a disable recording indication, it permanently disables the recording capabilities of the media player. The media file now is not accessible except for the purpose of playing the media file. To play the media file, a play indication is received by the controller. The controller then retrieves the content from the media file and sends the content to an output interface. In this manner, the media player only plays pre-loaded media content. The digital right for the content is protected against unauthorized copying while maintaining user friendliness of the media player.

32 Claims, 4 Drawing Sheets

METHOD AND SYSTEM FOR PLAY-ONLY MEDIA PLAYER

BACKGROUND

1. Field

This invention relates generally to media, particularly to a system and method for media player that only plays pre-loaded media content.

2. Related Arts

Digitization of pictures, music and movies brings convenience to the entertainment and media industry. Digital media has proved to be a highly efficient and effective distribution mechanism. For example, digital music download, music ripping and music CD burning by consumers are common.

The ease of media file distribution has had major business implications, especially in illegal copying. Examples were illegal music download through peer-to-peer copying mechanisms like Napster, or Kazaa. Or more frequently, a consumer copies downloaded music in MP3 format to CD's and MP3 players. In one example, John is a high school student. He, on Tuesday, purchased and downloaded last week's top 10 pop songs. He burned a music CD for his desktop music system with the songs. In addition, he ripped the songs to his iPod, his sisters' MP3 players, and his father's home media center. After John talked to his friends in the school, John copied the files to his classmates' MP3 players.

Several security mechanisms are being introduced to address the problem. They are mainly related to digital right management (DRM), where a signature is put into a media file, and a user is given a key. A media player would be able to play the media file only after the user presents the key. Often times, the key is given to the media player so that the media player can play the media file while other media players cannot play the media file. Although such security mechanisms partially solve the copying problem, they are very inconvenient to users. As in the above example, John downloaded to his PC the songs with DRM protection. In one embodiment, the key was given to John's PC. John was able to listen to the songs. After John ripped the songs to his iPod, he cannot play the songs with his iPod. Over a weekend, John's buys a new PC and transfers the songs to the new PC. John cannot play the songs on the new PC as the new PC does not have the key.

The above illustrates a need for a user friendly solution to protect against unauthorized copying of media content.

SUMMARY

A method and system for play-only media player is disclosed. The player includes a controller, a recording interface, and a non-removable storage. In recording content onto the media player, media signals are received through the recording interface. The media signals are stored in a media file on non-removable storage. When a controller receives a disable recording indication, it permanently disables the recording capabilities of the media player. The media file now is not accessible except for the purpose of playing the media file. To play the media file, a play indication is received by the controller. The controller then retrieves the content from the media file and sends the content to an output interface. In this manner, the media player only plays pre-loaded media content. The digital right for the content is protected against unauthorized copying while maintaining user friendliness of the media player.

DETAILED DESCRIPTION

Figure 1:
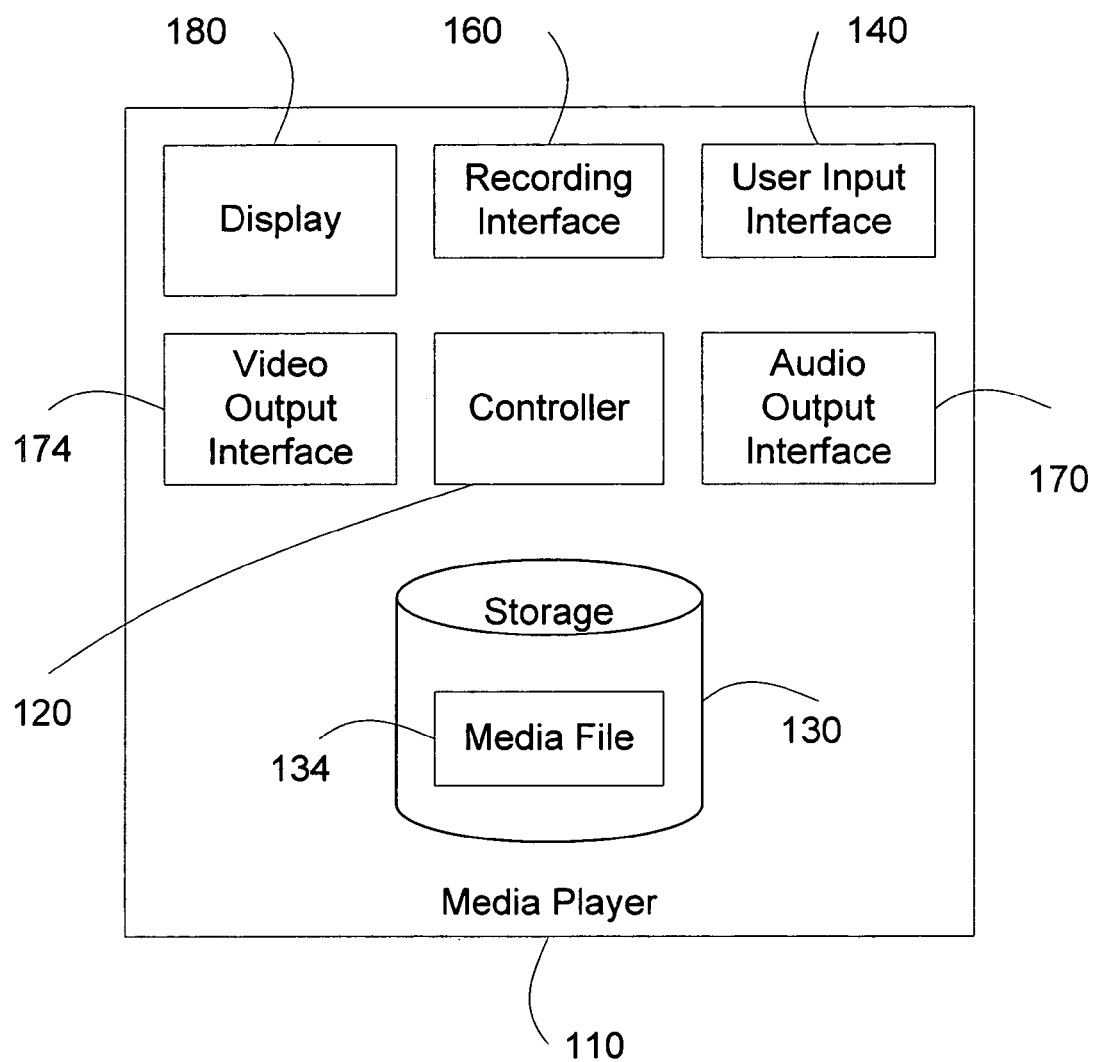
FIG. 1 illustrates a play-only pre-recorded media player.

FIG. 1 illustrates a play-only pre-recorded media player.

Media player 110 includes a plurality of components—controller 120, non-removable storage 130, recording interface 160, user input interface 140, and a display 180.

Storage 130 stores at least one media file 134. In one embodiment, media file 134 is an audio media file such as a song, an audio recording, a music concert recording, a talk show or an interview recording. In one embodiment, media file 134 is a music album. In one embodiment, media file 134 is a video media file such as a movie, a video recording such as a television program, a concert or a theatrical play recording, a music television (MTV™), a short film, a cooking, exercise or self-improvement instructional program, a documentary, a comic performance, or a lecture recording.

In one embodiment, storage 130 includes flash memory, or a hard disk drive. In one embodiment, storage 130 includes a database.

In one embodiment media file 134 include audio information; media player 110 includes an audio output interface 170 for audio information presentation. In one embodiment, audio output interface 170 includes an audio jack of various sizes, such as ¼" (6.35 mm), ⅛" (3.5 mm) or 3⁄32" (2.5 mm). In one embodiment, the audio jack is a two-conductor version for monophonic audio, or a three-conductor version for stereophonic audio. In one embodiment, audio output interface 170 includes a radio transmitter based on Personal Area Network (PAN) technology, such as Bluetooth technology. In one embodiment, audio output interface 170 includes a Radio Corporation of America (RCA) jack also known as a phono jack. In one embodiment, audio output interface 170 includes a speaker.

In one embodiment media file 134 includes video information. Media player 110 includes a video output interface 174 for video information presentation. In one embodiment, video output interface 174 includes a graphical display screen, such as a Thin-Film Transistor (TFT) screen, a Plasma Display Panel (PDP), a Liquid Crystal Display (LCD), or a Surface-conduction Electron-emitter Display (SED). In one embodiment, video output interface 174 includes an RCA jack, a composite video interface, or an S-Video interface. In one embodiment, video output interface 174 includes a High-Definition Multimedia Interface (HDMI) interface, or a High-Bandwidth Digital Content Protection (HDCP) interface. In an embodiment, video output interface 174 includes display 180.

Controller 120 records through recording interface 160 to storage 130. In one embodiment, recording interface 160 includes a Universal Serial Bus (USB) interface. In one embodiment, recording interface 160 includes an audio jack, an RCA jack, a component video interface, a composite video interface, or an S-Video interface. In one embodiment, recording interface 160 includes a High-Definition Multimedia Interface (HDMI) interface, or a High-Bandwidth Digital Content Protection (HDCP) interface. In one embodiment, recording interface 160 includes a network interface, such as an Ethernet interface.

Figure 2:
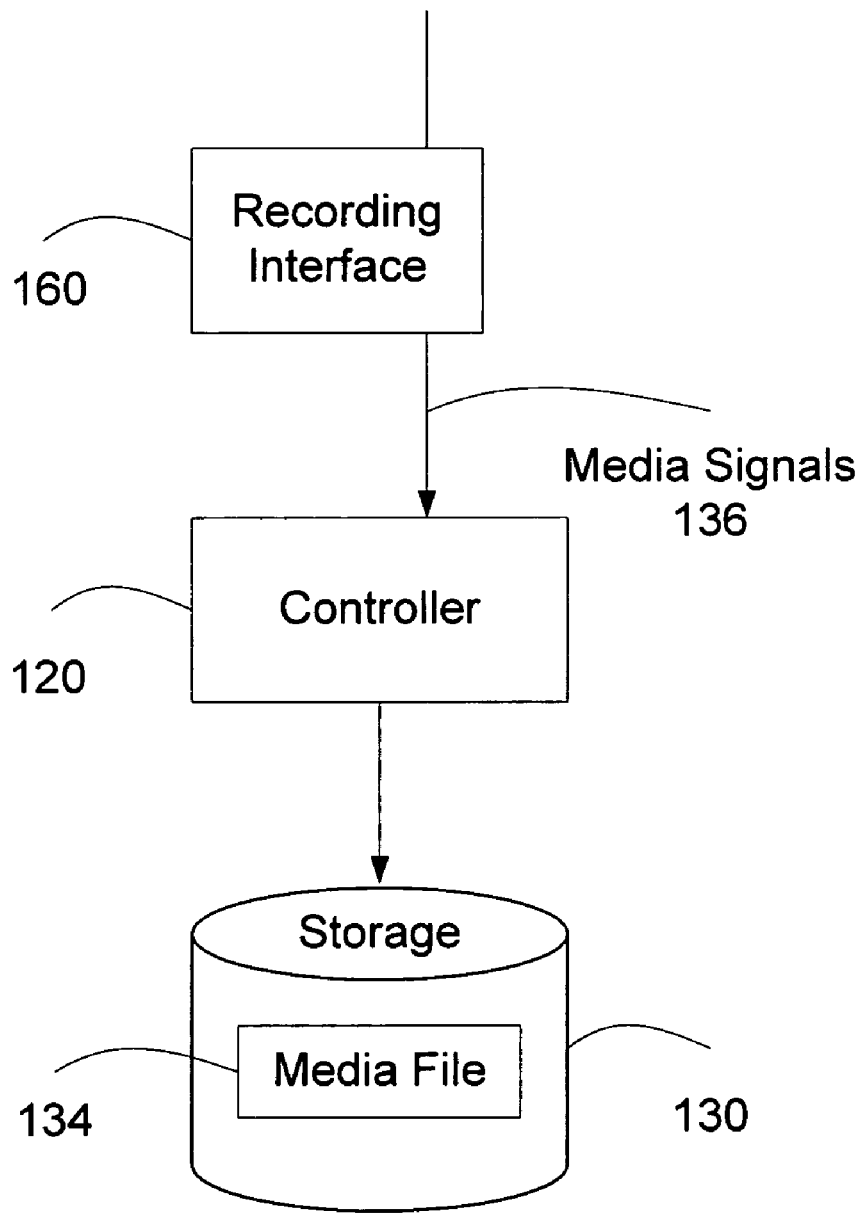
FIG. 2 illustrates a process for recording.

FIG. 2 illustrates a process for recording.

Controller 120 receives a plurality of media signals 136 through recording interface 160. In one embodiment, the plurality of media signals 136 are monophonic or stereophonic analog audio signals. In one embodiment, the plurality of media signals 136 are digital audio signals, such as Pulse Code Modulation (PCM) digital audio signals in 8 kHz 8-bit monophonic, 8 kHz 16-bit stereophonic, or 44.1 kHz 16-bit stereophonic format. In one embodiment, the plurality of media signals 136 are in a compressed codec format such as G723.1. In one embodiment, the plurality of media signals 136 are in Moving Picture Experts Group 1 (MPEG-1 Level-3) also known as MP3 digital format. In one embodiment, the plurality of media signals 136 are analog video signals in National Television System Committee (NTSC) or phase-alternating line (PAL) format. In one embodiment, the plurality of media signals 136 are digital video signals, such as MPEG-4, Windows Media Video (WMV) or Society of Motion Picture and Television Engineers (SMPTE) format.

Controller 120 stores media signals 136 in storage 130. Controller 120 combines a plurality of media signals 136 into media file 134 in storage 130.

In one embodiment, controller 120 records media file 134 by performing a media file transfer and media signals 136 includes portion of media file 134.

In another embodiment, controller 120 records media file 134 in a live performance setting, such as during a concert, a studio recording session, or a live interview. For example, controller 120 receives media signals 136 through recording interface 160 from a media system, such as a media mixer, a media amplifier, a studio production system, or a home entertainment system. The media system captures the live performance via one or more capturing devices such as microphone or video camera, processes or combines the captured signals into media signals 136 before sending to recording interface 160.

In one embodiment, controller 120 converts media signals 136 prior to storing in storage 130. In an embodiment, controller 120 converts analog audio signals into digital format such as MP3 format or PCM format. In one embodiment, controller 120 converts analogy video signals such as NTSC or PAL signals into MPEG4 format. In one more embodiment, controller 120 converts media signals 136 from a digital format to a different digital format prior to storing in storage 130.

In one embodiment, media signals 136 indicate an end of media file 134. Controller 120 completes storing media file 134 and starts storing subsequent received media signals to a new media file.

Figure 3:
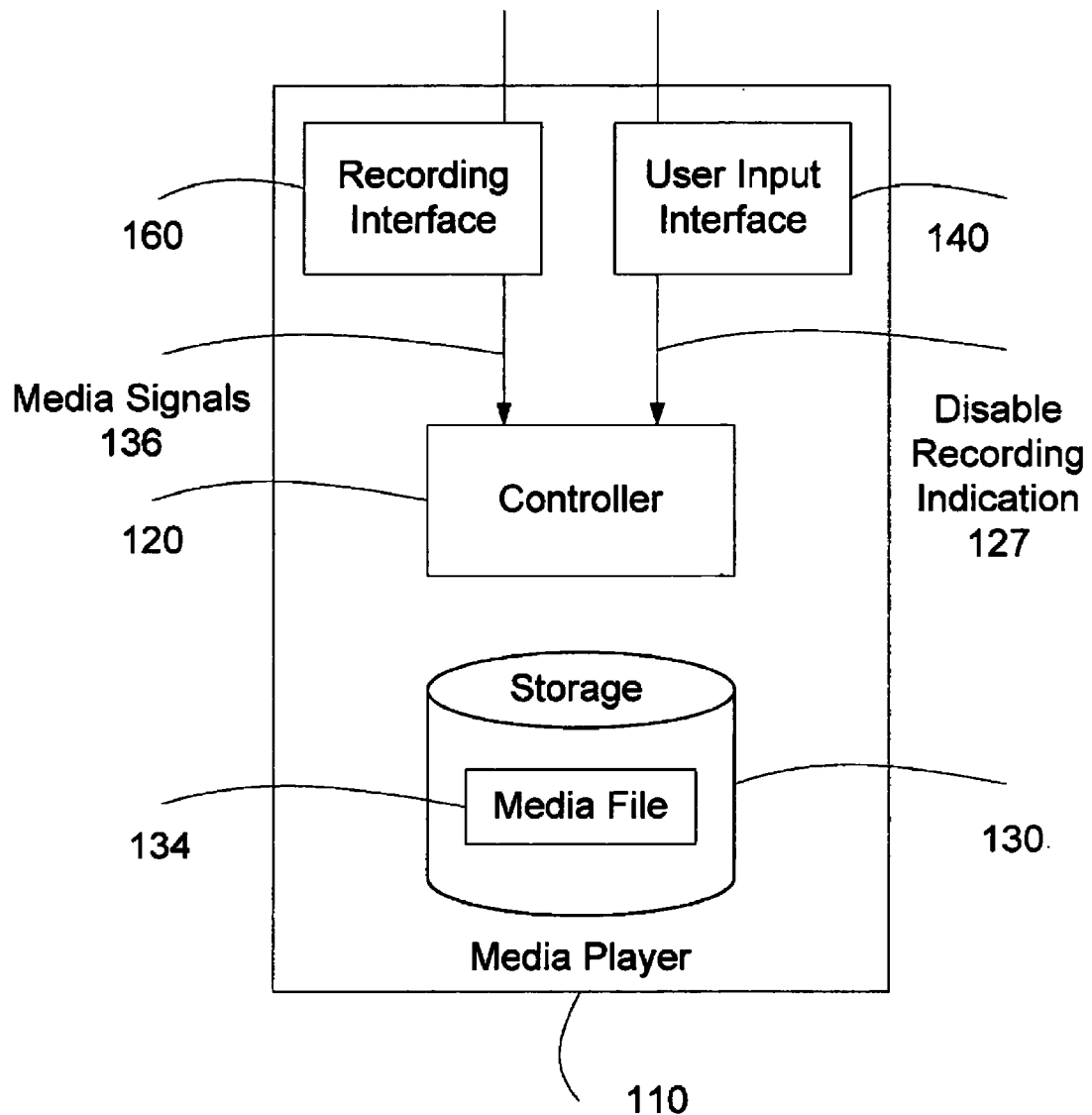
FIG. 3 illustrates a process for disabling recording.

FIG. 3 illustrates a process for disabling recording.

Controller 120 receives disable recording indication 127 from recording interface 160, or user input interface 140. After receiving disable recording indication 127, controller 120 permanently turns off recording capability. Subsequently controller 120 does not record media files into storage 130.

In one embodiment, controller 120 disables recording interface 160. In one embodiment, controller 120 permanently does not accept any media signal 136 from recording interface 160. In one embodiment, controller 120 discards any media signal 136 received from recording interface 160. In one embodiment, controller 120 permanently disables recording interface 160 such that recording interface 160 cannot receive any media signals. In one embodiment, recording interface 160 includes a hardware register, a relay, or a flip-flop; controller 120 permanently sets recording interface 160 such that recording interface 160 cannot receive any media signals.

In a different embodiment, an operator physically removed recording interface 160, or closes or seals the opening of recording interface 160 rendering recording interface 160 inoperable.

Once the recording capabilities of the media player 110 is disabled, the media file 134 cannot be accessed except by the controller 120 for the purpose of playing the media file 134.

Figure 4:
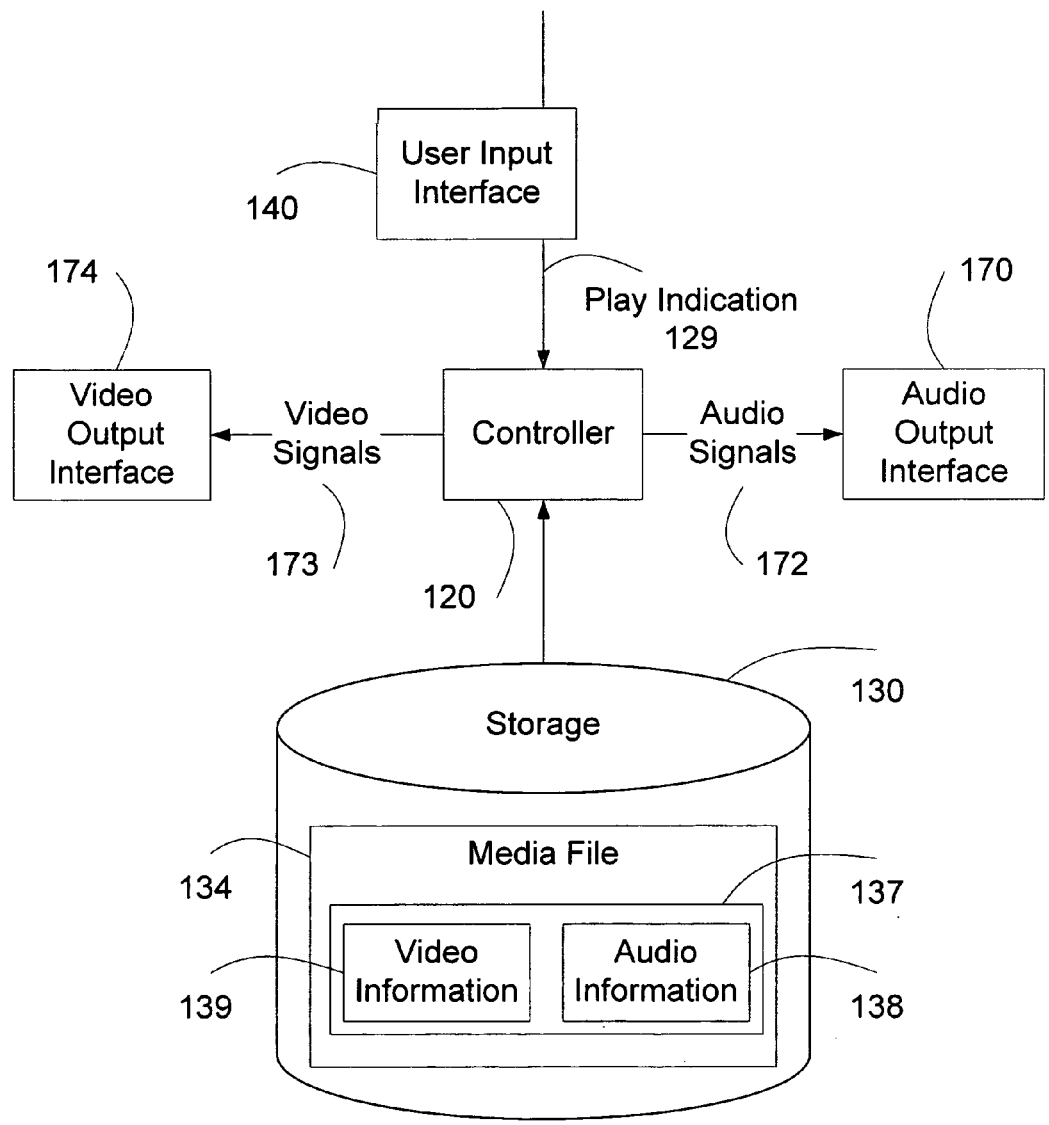
FIG. 4 illustrates a process for playing media file.

FIG. 4 illustrates a process for playing media file.

Controller 120 plays media file 134.

Controller 120 receives a play indication 129 from user input interface 140 to play. In one embodiment, play indication 129 specifies media file 134. In one embodiment, controller 120 selects media file 134. In an example, controller 120 selects randomly, the previously played media file, or the first media file from a file list.

Controller 120 retrieves content 137 from media file 134. In one embodiment, content 137 includes audio information 138. Controller 120 converts audio information 138 to audio signals 172, and sends audio signals 172 to audio output interface 170. In one embodiment, controller 120 converts MP3 digital signals into analog audio signals. In one embodiment, controller 120 converts a compressed digital audio format such as G723.1 into PCM format. In one embodiment, controller 120 converts the audio component of MPEG-4 format into analog audio signals.

In one embodiment, content 137 includes video information 139. Controller 120 converts video information 139 into video signals 173, and sends video signals 173 to video output interface 174. In one embodiment, controller 120 converts the video component of MPEG-4 format into the video component of NTSC format. In one embodiment, controller 120 converts the video component of MWV format into PAL format.

In one embodiment, media file 134 includes additional information such as an artist name, an author name, a music title, a movie title, time duration, or an album name. Controller 120 displays the information on display 180.

In one embodiment, display 180 includes a graphical or textual display screen. In one embodiment, display 180 includes a Light-emitting Diode (LED). In one embodiment, media player 110 does not include display 180.

In one embodiment, media player 110 is for audio recording for a concert, an interview, or a syndicated audio program. In one embodiment, media player 110 is for video recording for a play, a concert or a sports event. In one embodiment, media player 110 is for promotion purpose, such as corporate product promotion, market promotion, company promotion or event promotion. In one embodiment, media play 110 is for media distribution. In one embodiment, media player 110 is for rental purpose. In one embodiment media player 110 plays media file 134 only once, maximum three times or within 24 hours.

In one embodiment, media player 110 includes a non-replaceable and non-rechargeable battery as power source. Media play 110 cannot play media file 134 once the battery is fully discharged.

In one embodiment, the controller 120 and the non-removable storage 130 are integrated on a system on chip (SOC).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for recording content onto a play-only media player, comprising the steps of:
   (a) receiving a plurality of media signals through a recording interface;
   (b) storing the plurality of media signals in a media file on a non-removable storage;
   (c) receiving a disable recording indication; and
   (d) permanently disabling recording capabilities of the media player in response to the disable recording indication.

2. The method of claim 1, wherein the storing (b) comprises:
   (b1) converting the plurality of media signals; and
   (b2) storing the converted plurality of media signals in the media file on the non-removable storage.

3. The method of claim 1, wherein the storing (b) comprises:
   (b1) determining the plurality of media signals comprises an end of media file indication; and
   (b2) completing the storing of the plurality of signals in the media file on the non-removable storage in response to the end of media file indication.

4. The method of claim 1, wherein the disable recording indication is received from the recording interface.

5. The method of claim 1, wherein the disable recording indication is received from a user input interface.

6. The method of claim 1, wherein the permanently disabling (d) comprises:
   (d1) permanently disabling the recording interface.

7. The method of claim 1, wherein the permanently disabling (d) comprises:
   (d1) permanently stop accepting any media signals from the recording interface.

8. The method of claim 1, wherein the permanently disabling (d) comprises:
   (d1) discarding any further media signals received from the recording interface.

9. The method of claim 1, wherein the permanently disabling (d) comprises:
   (d1) permanently disabling the recording interface such that the recording interface cannot receive any further media signals.

10. The method of claim 1, wherein the permanently disabling (d) comprises:
    (d1) permanently setting the recording interface such that the recording interface cannot receive any further media signals.

11. The method of claim 1, wherein the permanently disabling (d) comprises:
    (d1) physically and permanently disabling the recording interface.

12. The method of claim 1, wherein once the recording capabilities of the media player are disabled, the media file cannot be accessed except for the purpose of playing the media file.

13. The method of claim 1, further comprising:
    (e) receiving a play indication from a user input interface to play the media file stored in the media player;
    (f) retrieving content from the media file;
    (g) playing the content.

14. The method of claim 13, wherein the play indication specifies the media file.

15. The method of claim 13, wherein the content from the media file comprises additional information about the content, wherein the additional information is displayed.

16. The method of claim 13, wherein the playing (g) comprises:
    (g1) sending the content to an output interface.

17. A media player, comprising:
    a non-removable storage;
    a recording interface; and
    a controller, wherein the controller receives a plurality of media signals through the recording interface, stores the plurality of media signals in a media file on the non-removable storage, receives a disable recording indication, and permanently disables recording capabilities of the media player in response to the disable recording indication.

18. The player of claim 17, wherein the controller determines the plurality of media signals comprises an end of media file indication, and completes storage of the plurality of signals in the media file on the non-removable storage in response to the end of media file indication.

19. The player of claim 17, wherein the controller converts the plurality of media signals and stores the converted plurality of media signals in the media file on the non-removable storage.

20. The player of claim 17, wherein the disable recording indication is received from the recording interface.

21. The player of claim 17, wherein the disable recording indication is received from a user input interface.

22. The player of claim 17, wherein in permanently disabling the recording capabilities, the controller permanently disables the recording interface.

23. The player of claim 17, wherein in permanently disabling the recording capabilities, the controller permanently stops accepting any media signals from the recording interface.

24. The player of claim 17, wherein in permanently disabling the recording capabilities, the controller discards any further media signals received from the recording interface.

25. The player of claim 17, wherein in permanently disabling the recording capabilities, the controller permanently disables the recording interface such that the recording interface cannot receive any further media signals.

26. The player of claim 17, wherein in permanently disabling the recording capabilities, the controller permanently sets the recording interface such that the recording interface cannot receive any further media signals.

27. The player of claim 17, wherein the recording interface is physically and permanently disabled.

28. The player of claim 17, wherein once the recording capabilities of the media player is disabled, the media file cannot be accessed except for the purpose of playing the media file.

29. The player of claim 17, further comprising:
    a user input interface; and
    an output interface;
    wherein the controller receives a play indication from the user input interface to play the media file, retrieves content from the media file, and sends the content to the output interface.

30. The player of claim 29, wherein the play indication specifies the media file.

31. The player of claim 29, wherein the controller selects the media file.

32. The player of claim 29, further comprising a display, wherein the content from the media file comprises additional information about the content, wherein the additional information is displayed on the display.

* * * * *